April 4, 1967 E. BERNER 3,312,760
METHOD FOR THE PRODUCTION OF SLABS OF
FOAMED THERMOPLASTIC MATERIAL
Original Filed Jan. 24, 1962 2 Sheets-Sheet 2

INVENTOR.
Erling Berner
BY

United States Patent Office 3,312,760
Patented Apr. 4, 1967

3,312,760
METHOD FOR THE PRODUCTION OF SLABS OF FOAMED THERMOPLASTIC MATERIAL
Erling Berner, New Castle, Pa., assignor to WMB International AB, Stockholm C, Sweden, a corporation of Sweden
Continuation of application Ser. No. 168,335, Jan. 24, 1962. This application Oct. 22, 1965, Ser. No. 511,266
2 Claims. (Cl. 264—51)

This application is a continuation of abandoned application Ser. No. 168,335, filed Jan. 24, 1962.

This invention relates to the production of bodies from synthetic thermoplastic material.

More particularly this invention relates to a method for the production of slabs of a porous synthetic thermoplastic material in the shape of a continuously advancing coherent body beginning with grains or granules of synthetic thermoplastic material containing an expanding agent, the grains or granules being fed into one end of an elongated channel open at both ends and on at least two sides bounded by endless bands and having a heating zone wherein the granules introduced into the channel are caused to expand and during their expansion to agglutinize to be conveyed thereupon through a cooling zone.

One main object of the present invention is to provide an effective novel cooling step avoiding any appreciable reduction of the volume of the coherent porous body.

Another object of the invention is to provide a novel cooling process permitting to use a higher speed of the endless bands than had been possible hitherto.

In accordance with one main feature of the invention the coherent body of agglutinized plastic material when advancing through the cooling zone is subjected to a negative pressure on at least two opposite sides in order to render possible a cooling while simultaneously counteracting a shrinkage of the body.

An apparatus particularly adapted to carry out the method embodying the invention has vacuum transmitting means disposed at at least two opposite sides of the channel at places where said channel is bounded by perforated belt portioins, said means being sealed against said belt portions and connected to a source of vacuum.

Further objects and advantages of the invention will become apparent from the following description, considered in connection with the accompanying drawings which form part of this specification and of which:

Figure 1:
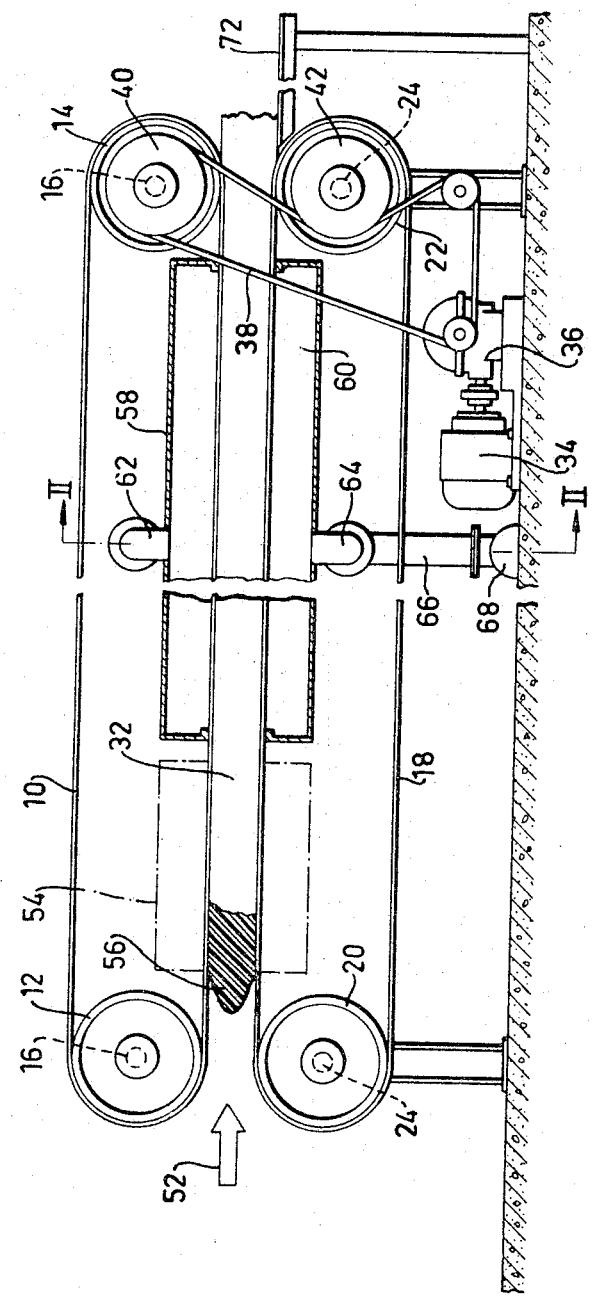
FIG. 1 is a partly sectional lateral elevation of an apparatus devised for carrying out the method according to the invention.

Referring to the drawings, reference numeral 10 denotes an upper endless belt running over two turning drums 12, 14 having each a horizontal shaft 16 mounted in bearings 17. A lower endless belt 18 is disposed to pass over turning drums 20 and 22, each of which is carried by a horizontal shaft 24 rotatably mounted in bearings 25. Both said belt are perforated. Two further belts 26 and 27, respectively, shown in FIG. 2, which for purpose of improved clearness are assumed removed in FIG. 1, extend between turning drums 28 and 29, respectively, supported by vertical shafts 30 and 31, respectively. The shafts 30 and 31 are mounted in bearings 33 and 35, respectively. The surface portions of the belts facing one another define a longitudinal channel 32 open at both ends and having a rectangular cross-section. The belts are driven by a common motor 34 through a reduction gear 36 and a driving belt 38 positioned about a belt pulley 40 mounted on the shaft 16 of the turning drum 14 and a belt pulley 42 mounted on the shaft 24 of the lower turning drum 22. Mitre wheel gearings 44, 46 rigidly secured to said shaft 24 engage mitre wheel gearings 48, 50 rigidly secured to the vertical shafts 30 and 31, respectively.

The granular thermoplastic material is introduced into one end of the channel 32 as is indicated by the arrow 52. In spaced relation to both turning drums 12, 20 a heating zone diagrammatically indicated at 54 is provided for. The granules when introduced into the channel 32 may be partly expanded beforehand, as is described in the abandoned patent application Ser. No. 576,052, filed Apr. 4, 1956, by Lars Sten Robert Norrhede et al., and owned by the assignee of applicant or the entire expansion may be produced between the belts, as is described in my patent application Ser. No. 859,012, filed Dec. 11, 1959, now Patent No. 3,065,500, dated Nov. 27, 1962.

The heating of the granules of plastic material may be effected by means of steam which is introduced through the perforations of the upper and lower belts as is described more detailed in the first-mentioned patent application to which reference is made for a closer description. Other methods of heating capable of effecting the results hereinafter set forth may be possible also. The means to effect the introduction of the granules and the heating thereof do not pertain to the present invention and will therefore not be described in more detail. The only feature of importance in the present connection is that the granules are heated in the heating zone 54 and in their expanded highly porous condition are caused to agglutinize into a coherent body which ahead of the heating zone may initially be given the form of a kind of plug 56 (see FIG. 1).

Figure 2:
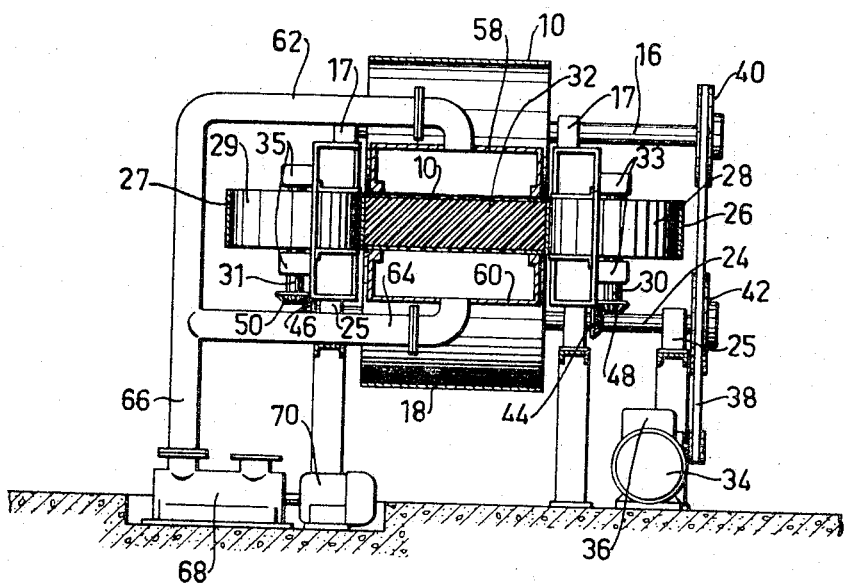
FIG. 2 is a partly sectional elevation following line II—II of FIG. 1.

The coherent body thus obtained while being carried by the belts to the right viewed in the plane of FIG. 1, is caused to pass a cooling zone which is provided with vacuum bowls denoted 58, 60 and suitably located adjacent the upper band 10 and the lower band 18. If desired, such bowls may also be disposed adjacent the small sides of the channel 32 formed by the belts 26, 28. The vacuum bowls are connected by conduits 62, 64 and 66 with a vacuum pump 68, driven by a motor 70. The vacuum bowls 58, 60 are sealed against the belts 10 and 18 respectively.

During the cooling step the coherent body of expanded granules of thermoplastic material is subjected to a negative pressure propagating through the perforated belts into the body proper. The negative pressure exercised on both sides of the body prevents said body from shrinking during the cooling step, which shrinking otherwise would cause the cells to have their cross-section and thus the body its porosity reduced and possibly even to collapse while the body would get a cross-section deviating from the rectangular one. The negative pressure renders it possible for the cells of the body while making use of a minor remaining expanding power to retain their dimensions obtained in the preceding heating zone and even slightly to increase them. In this way, a larger volume of porous material is produced from one unit of starting material and thus a more economical production than hitherto is obtained. The improved cooling effect is partly due to quick evaporation of condensate present in the body whereby heat is consumed. This feature contributes to the possibility of operating the apparatus at a higher speed than was realizable hitherto.

The final coherent product leaves the channel 32 at its end located at right-hand viewed in the plane of FIG. 1 and is conveyed therefrom to a table where it is cut into pieces of appropriate length.

While one more or less specific embodiment of the invention has been shown and described, it is to be understood that this is for purpose of illustration only, and that the invention is not to be limited thereby, but its scope is to be determined by the appended claims.

What I claim is:

1. A method for production of slabs of synthetic porous thermoplastic material from a continuously advancing body beginning with granules containing an expanding agent, the granules being fed into one end of an elongated channel open at both ends and on at least two sides bounded by endless belts and having a steam heating zone wherein the granules are introduced into the channel and caused to expand and during their expansion to agglutinize to be conveyed thereafter through a cooling zone, characterized in that the body when advancing through said cooling zone is subjected to a negative pressure exercised on two of its opposite sides extending in the direction of movement of the body, the entrance and exit sides of the body from the cooling zone being under substatially atmospheric pressure in order to cool the body while maintaining a pressure drop within the body toward said opposite sides thereby counteracting a shrinkage of the body.

2. A method for production of slabs of synthetic porous thermoplastic material from a continuously advancing body beginning with granules containing an expanding agent, the granules being fed into one end of an elongated channel open at both ends and on at least two sides bounded by endless belts and having a steam heating zone wherein the granules are introduced into the channel and caused to expand and during their expansion to agglutinize to be conveyed thereafter through a cooling zone, characterized in that the body when advancing through said cooling zone is subjected to a negative pressure effective on two of its opposite sides extending in the direction of movement of the body, the entrance and exit sides of the body from the cooling zone being under substantially atmospheric pressure in order to cool the body while maintaining a pressure drop within the body toward said opposite sides thereby counteracting a shrinkage of the body.

References Cited by the Examiner

UNITED STATES PATENTS

| | | | |
|---|---|---|---|
| 2,245,640 | 6/1941 | Beattie | 264—176 |
| 3,015,851 | 1/1962 | Wiles | 264—101 XR |
| 3,086,248 | 4/1963 | Culp | 264—101 XR |

ALEXANDER H. BRODMERKEL, *Primary Examiner.*

ROBERT F. WHITE, *Examiner.*

P. E. ANDERSON, *Assistant Examiner.*